United States Patent [19]

Bougher et al.

[11] Patent Number: 4,919,484

[45] Date of Patent: * Apr. 24, 1990

[54] ANTI-CINCH SEAT BELT SYSTEM

[75] Inventors: Jerry D. Bougher, Lebanon; James R. Anthony, Carmel; Jeffrey L. Williams, Zionsville; Ronald F. Homeier, Plainfield; Allan R. Lortz, Carmel, all of Ind.

[73] Assignee: Indiana Mills & Manufacturing, Inc., Westfield, Ind.

[*] Notice: The portion of the term of this patent subsequent to May 23, 2006 has been disclaimed.

[21] Appl. No.: 302,788

[22] Filed: Jan. 26, 1989

Related U.S. Application Data

[63] Continuation-in-part of Ser. No. 111,182, Oct. 22, 1987.

[51] Int. Cl.⁵ .............................................. A47C 31/00
[52] U.S. Cl. ..................................... 297/474; 280/801
[58] Field of Search ....................... 297/468, 474, 480; 280/801

[56] References Cited

U.S. PATENT DOCUMENTS

| | | | |
|---|---|---|---|
| 3,107,121 | 10/1963 | Mougey | 297/474 |
| 3,243,232 | 3/1966 | Blaszkowski | 297/474 |
| 3,300,248 | 1/1967 | Nakolan | 297/474 |
| 3,318,634 | 5/1967 | Nicholas | 297/474 |
| 3,429,614 | 2/1969 | Huggins | 297/474 |
| 3,551,002 | 12/1970 | Dozois | 297/474 |
| 3,583,763 | 6/1971 | Settimi | 297/474 |
| 3,584,896 | 6/1971 | Jantzen | 297/474 |
| 3,606,456 | 9/1971 | Cazabon | 297/474 |
| 4,201,418 | 5/1980 | Reidelbach | 297/474 |
| 4,506,912 | 3/1985 | Ahad | 297/474 X |
| 4,611,854 | 9/1986 | Pfeiffer | 280/801 X |

Primary Examiner—Peter A. Aschenbrenner
Attorney, Agent, or Firm—Woodard, Emhardt, Naughton, Moriarty & McNett

[57] ABSTRACT

A seat belt system which incorporates a seat belt assembly including a buckle and mounting brackets, a tongue, a retractor, and webbed belting is disclosed in combination with a member for collecting a predetermined amount of slack in the system in lieu of its collection by the retractor. The member for collecting slack having a relatively retracted first position and a relatively extended second position and including a feature to urge the member to the first position. The application of an external force of sufficient magnitude causes the member to move to the second position, but when the force is withdrawn, the member returns to the first position. When used in a system which also incorporates a retractor assembly, the seat buckle assembly overcomes the tendency of the system to cinch down on the user.

18 Claims, 12 Drawing Sheets

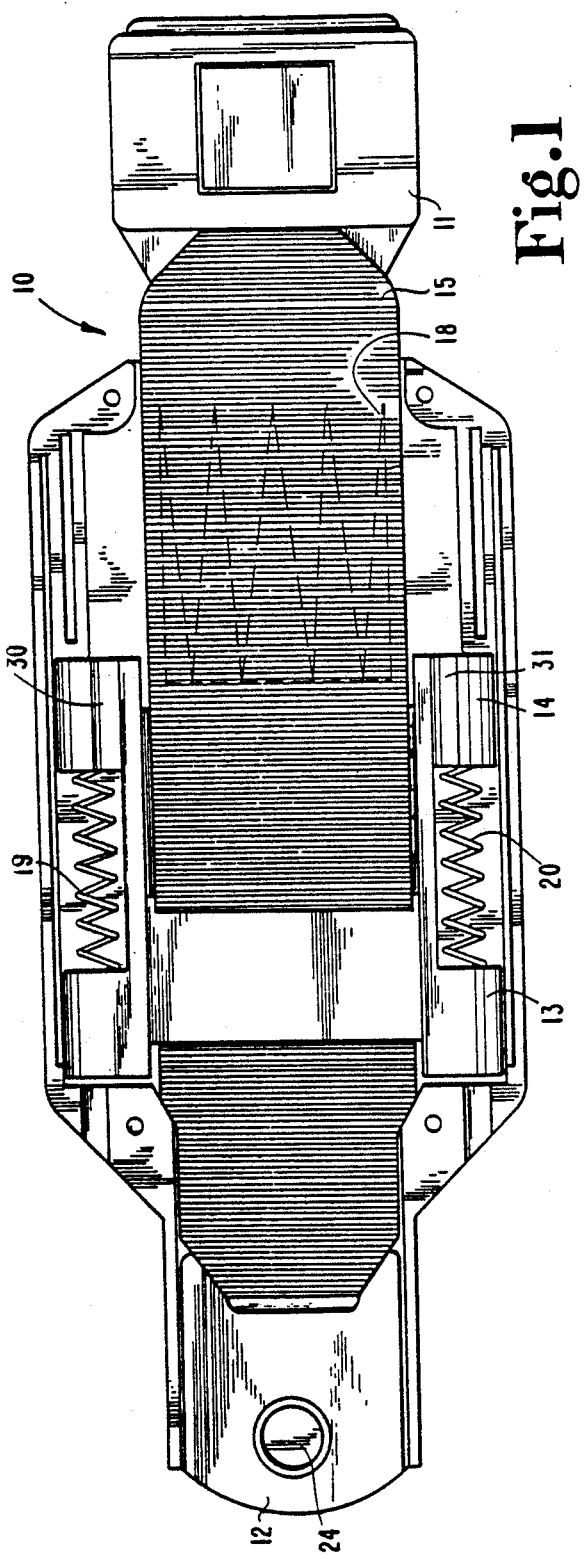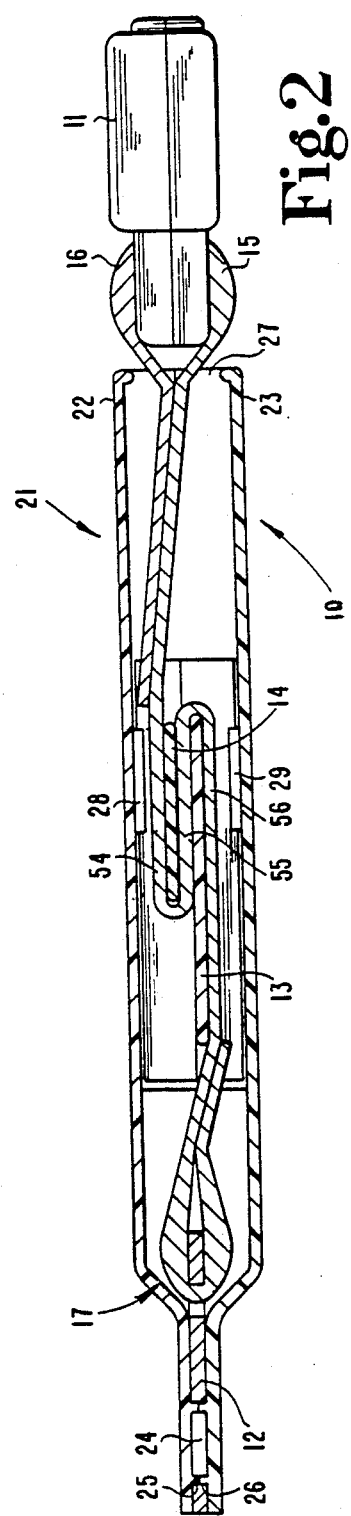

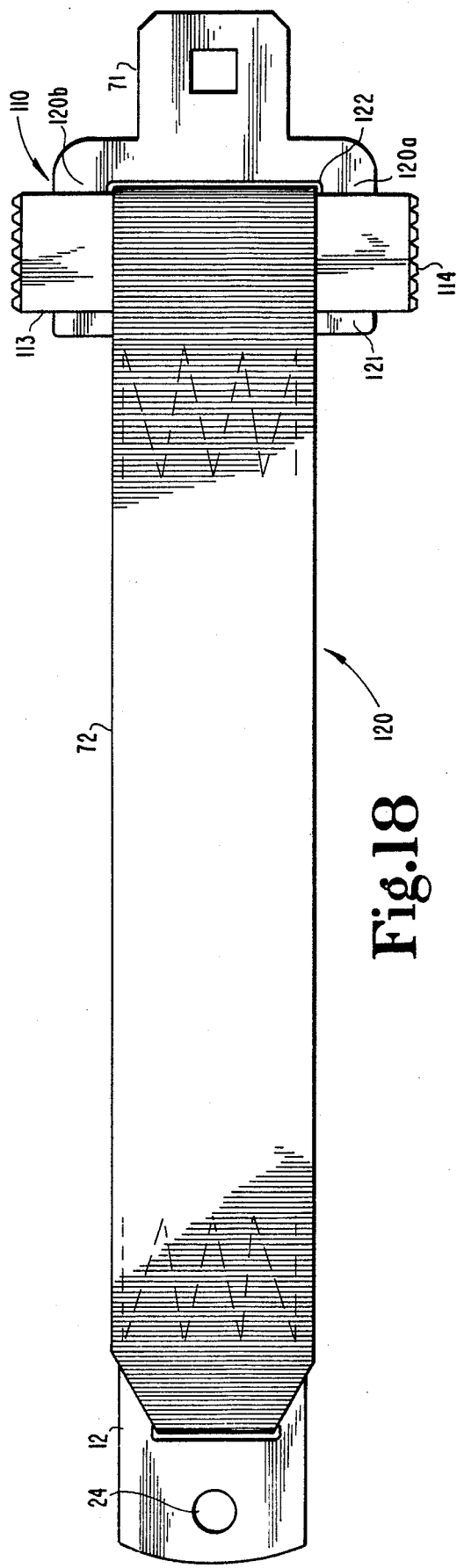
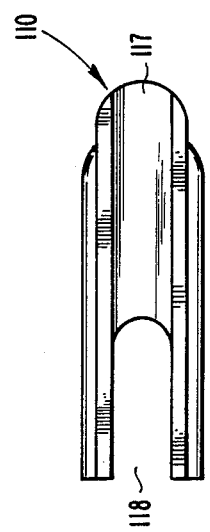
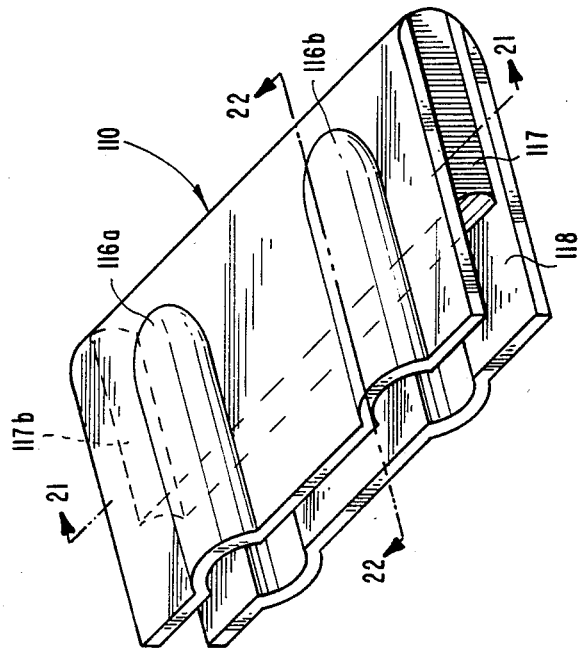
Fig.18
Fig.20
Fig.19

ANTI-CINCH SEAT BELT SYSTEM

CROSS REFERENCE TO RELATED APPLICATION

This application is a continuation-in-part of U.S. patent application Ser. No. 111,182, filed Oct. 22, 1987.

BACKGROUND OF THE INVENTION

1. Field of the Invention

This invention relates to the field of seat belt systems, including buckles, retractors, webbing and tongues, and particularly to an assembly useful in a seat belt system which includes an automatic locking belt retractor.

2. Description of the Prior Art

Seat and shoulder belt systems, such as typically employed in passenger vehicles, include an automatic retractor device for collecting excess belting and providing tensioning for the system. The system may include, for example, a spring-biased spool for urging the webbed belt around the spool and thus into the retractor. Once the seat belt and shoulder harness are secured by buckling, the excess belt is retracted.

In systems including an automatic locking retractor, the belt will pay out of the retractor only after the belt has been fully retracted. One drawback of such systems is that the belt may therefore cinch down on the occupant, and the tightened condition cannot be relieved without removing the belt and retracting it fully into the retractor. During a rough ride, the occupant may be pushed or bounced down in the seat, at which time the retractor recognizes the slack in the belt and takes it up. When the seat attempts to move to the original position, the retractor will not pay webbing out, and the occupant is restrained in the lower position.

The present invention overcomes the cinching problem by providing a mechanism to offset the tendency of the retractor to collect all of the slack in the belt. The present invention includes a means for collecting a portion of the extended belt in lieu of collection by the automatic locking retractor that will then pay the collected belting back out to compensate for movement in the vehicle seat.

SUMMARY OF THE INVENTION

Briefly describing one aspect of the present invention, there is provided a seat belt system which includes a retractor assembly, a tongue, joining parts, a mounting bracket, a belt buckle, and an element for collecting a portion of the extended seat belt for later pay out, thus preventing cinching of the belt on the user. In one embodiment of the present invention, first and second members are connectable with the bracket and the buckle, respectively. These connecting members are coupled with and movable relative one another corresponding with retraction or extension of the buckle relative the bracket. This assembly further includes a component for normally maintaining the buckle in the retracted position but permitting the buckle to be extended in response to an external force of predetermined amount and returning the buckle to the retracted position upon decrease of the external force.

In another embodiment of the present invention, an elastic member is incorporated in the tongue assembly or the buckle assembly to collect a portion of the seat belt slack when normally at rest. Upon exertion of an external force of predetermined magnitude the elastic member stretches to pay out a determinate amount of seat belt slack. The elastic force of the elastic member causes the slack to be recollected once the external force subsides.

In a further embodiment of the present invention, a substantially U-shaped member is movable relative the tongue or buckle, depending upon to which it is attached. The U-shaped member collects slack in a first position relative the tongue or buckle, and pays out the collected slack in a second position. The U-shaped member is further equipped to return to the first position upon decrease of the external force.

It is an object of the present invention to provide a seat belt system which overcomes the tendency of a component automatic locking retractor assembly to cinch down upon a user.

A further object of the present invention is to provide a seat belt buckle or tongue assembly which is useful in conjunction with an automatic locking retractor assembly.

It is another object of the present invention to provide a seat belt system, including a buckle assembly which is compact in design and has a long life expectancy.

Another object of the present invention is to provide a seat belt buckle assembly which parallels the seat belt system, thus not impairing operation or use of the system and not requiring high strength to operate.

It is a further object of the present invention to provide a means to collect slack in a seat belt system for later pay-out of the collected slack overcoming the tendency of a component automatic locking retractor assembly to cinch down upon a user.

Further object and advantages of the present invention will become apparent from the description of the preferred embodiment which follows.

BRIEF DESCRIPTION OF THE DRAWINGS

FIG. 1 is a top, plan view of the buckle assembly of one embodiment of the the present invention, showing the top of the cover removed.

FIG. 2 is a side, cross-sectional view of the assembly of FIG. 1.

FIG. 18 is a top, plan view of the left portion of the third embodiment of the present invention with a tongue assembly attached in lieu of a buckle assembly.

FIG. 19 is a perspective view of the U-shaped bracket component of FIG. 18 without optional grippers.

FIG. 20 is a side, plan view of the bracket of FIG. 19.

DESCRIPTION OF THE PREFERRED EMBODIMENT

Figure 3:
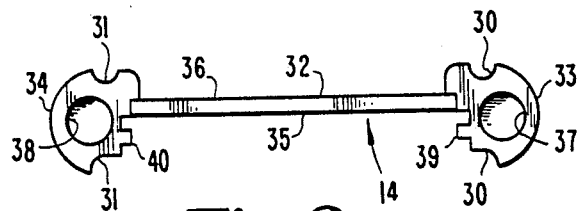
FIG. 3 is a first end view of a connecting member useful in accordance with the embodiment of FIG. 1.
Figure 4:
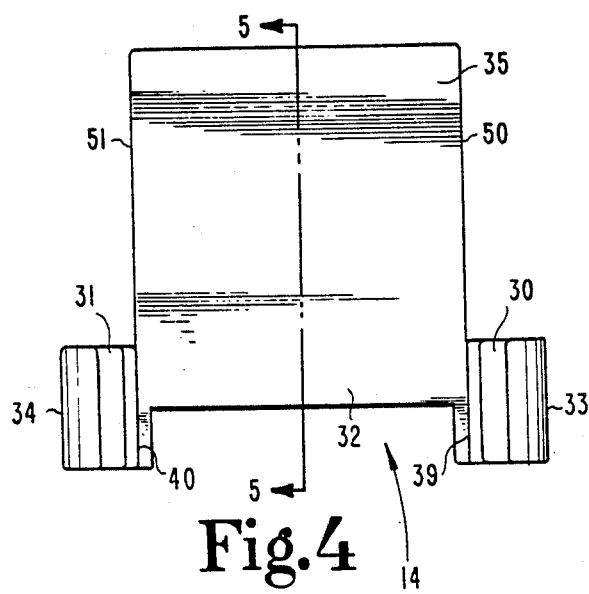
FIG. 4 is a top, plan view of the connecting member of FIG. 3.
Figure 5:
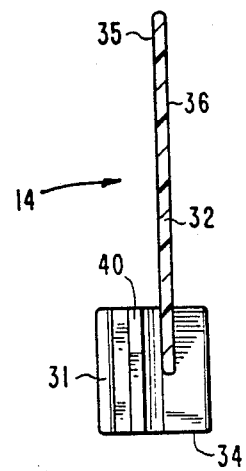
FIG. 5 is a side, cross-sectional view of the connecting member of FIG. 4, taken along the line 5—5 and looking in the direction of the arrows.
Figure 6:
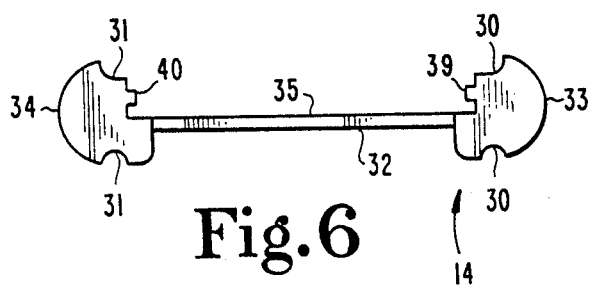
FIG. 6 is a second end view of the connecting member of FIG. 3.
Figure 7:
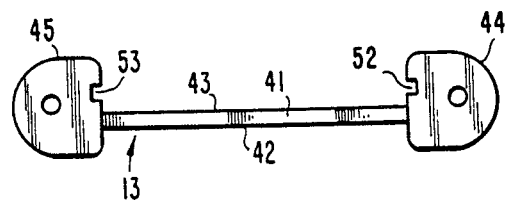
FIG. 7 is a first end view of a second connecting member useful in accordance with the embodiment of FIG. 1.
Figure 8:
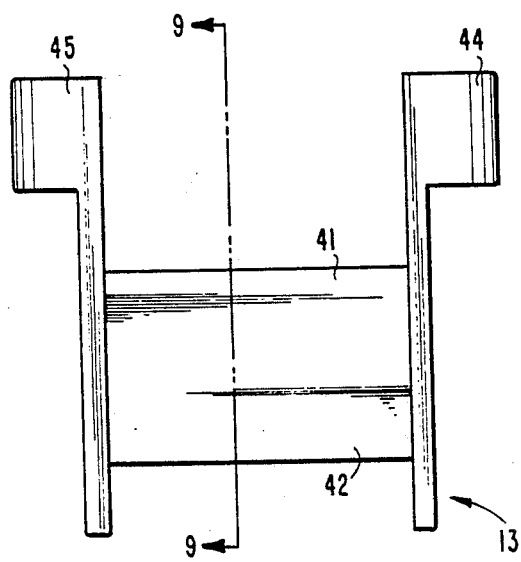
FIG. 8 is a top, plan view of the second connecting member of FIG. 7.
Figure 9:
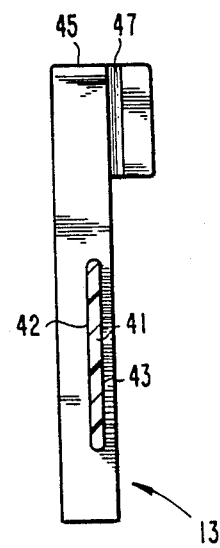
FIG. 9 is a side, cross-sectional view of the second connecting member of FIG. 8, taken along the line 9—9 and looking in the direction of the arrows.
Figure 10:
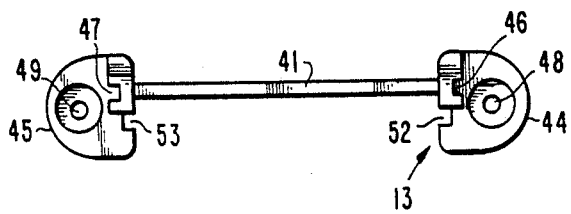
FIG. 10 is a second end view of the second connecting member of FIG. 7.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

In certain seat belt systems, an automatic locking retractor is employed. This retractor operates so that the excess length of belt is collected and the belt is then locked in this position. In such devices, however, it is possible that the retractor may withdraw an excess amount of the belt, thus holding the user in a more restricted position than desired.

For example, certain vehicles employ seats which have a significant amount of movement, such as vertical motion resulting from passage of the vehicle over a rough surface. It is possible in these conditions for an automatic locking retractor to "cinch down" the lap belt on the occupant, since an additional length of belt may be withdrawn and locked when the seat moves downwardly relative the vehicle. The present invention provides a mechanism useful, for example, in systems having an automatic locking retractor, in order to avoid the "cinching down" of the lap belt.

Referring particularly to the drawings, in FIGS. 1 through 13 there is shown a seat belt buckle assembly 10 constructed in accordance with one embodiment of the present invention. As shown in FIGS. 1 and 2, the assembly 10 includes a seat belt buckle 11 connected with a mounting bracket 12. The buckle 11 may be of any conventional design such as typically used with seat belts. The bracket 12 similarly may be provided in any desired configuration suitable for mounting the assembly to a vehicle in a desired manner. As will be described hereafter, means are provided for connecting the buckle 11 to the bracket 12 through a pair of connecting members 13 and 14. The buckle and bracket are preferably connected by means of a flexible webbing 15 having a first end 16 secured to the buckle 11 and a second end 17 secured to the bracket 12, both as by looping through apertures and stitching, as shown at 18, to the adjacent webbing material.

The first connecting member 13 is coupled with the second connecting member and movable relative thereto. Preferably, the first member 13 is slidable with respect to the second member 14 as it is described hereafter with respect to subsequent figures. A pair of compression springs 19 and 20 urge the connecting members into a first position which holds the buckle 11 in a relatively retracted position. The connecting members are movable relative one another, against the resistance of the springs 19 and 20, to move the buckle into a second, relatively extended position.

As shown in FIG. 2, the connecting members and substantial portions of the webbing 15 are contained within a cover 21, including top and bottom halves 22 and 23, respectively. The bracket 12 includes a mounting hole 24 which is secured about annular projections 25 and 26. At the opposite end of the cover, there is defined an opening 27 through which the buckle 11 and webbing 16 are extendable. Each of the cover halves on both sides of the cover define raised rails, such as 28 and 29, which are received in grooves such as 30 and 31 in the adjacent connecting members, helping to stabilize the member 14 in position within the cover.

Referring in particular to FIGS. 3–6, there is shown in detail the configuration of the connecting member 14. Member 14 includes a center portion 32 and a pair of outer portions 33 and 34. The center portion is an extended, planar shape having an inner surface 35 and an outer surface 36. The outer portions define grooves 30 and 31, and include recesses 37 and 38 for reception of first ends of the springs 19 and 20. The outer portions 33 and 34 further define a pair of oppositely-facing tongues 39 and 40 which are slidably received within respective grooves defined by the other connecting member 13.

Referring now in particular to FIGS. 7–10, there is shown the detailed configuration of the connecting member 13. Member 13 includes a center portion 41 which is a planar, rectangular member having an inner surface 42 and an outer surface 43. Member 13 also includes a pair of outer portions 44 and 45 defining oppositely-facing grooves 46 and 47 within which are received the tongues 39 and 40, respectively. Recesses 48 and 49 are also provided in the outer portions 44 and 45 for reception of a second end of each of the springs 19 and 20. In addition, outer edges 50 and 51 of the center portion 32 of connecting member 14 are received within the inwardly facing grooves 52 and 53 of connecting member 13.

Figure 11:
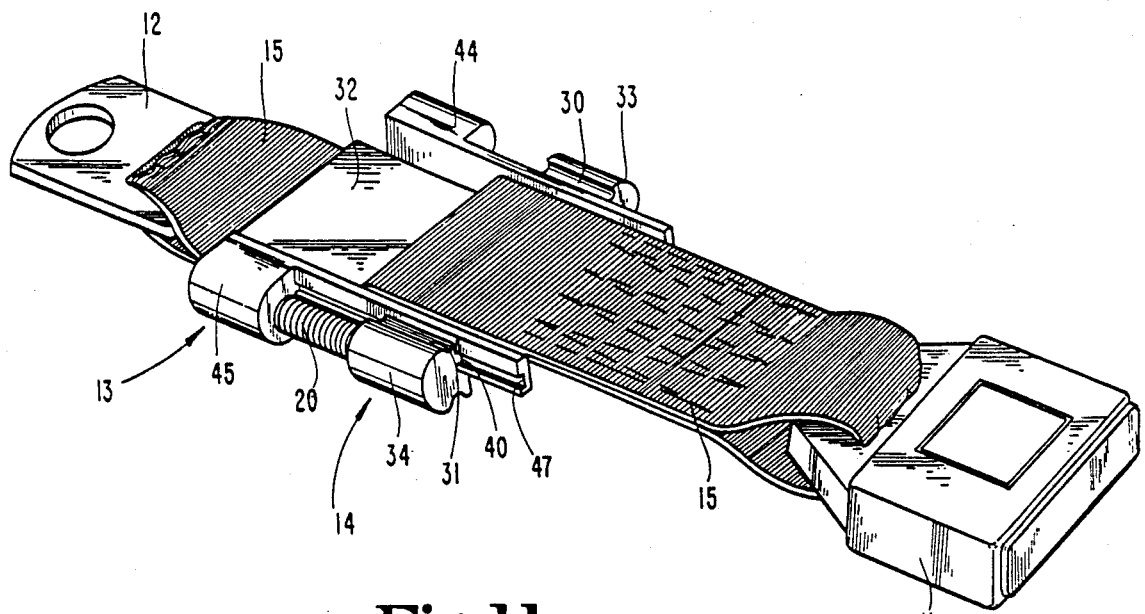
FIG. 11 is a perspective view of the assembly of FIG. 1 showing the cover fully removed and the buckel in the extended position relative the connecting members.

As shown for example in FIGS. 2 and 11, the connecting members 13 and 14 are movable relative one another between first and second positions. The connecting members are coupled with one another to provide relative movement, preferably sliding movement. In FIG. 1 the sliding members 13 and 14 are shown with the springs 19 and 20 in the relaxed condition and the buckle is in the relatively retracted position. When external force is applied to pull the buckle outwardly of the assembly, the members slide against the resistance afforded by compression springs 19 and 20 to the position as shown, for example, in FIG. 11. The buckle is then moved into a relatively extended position relative the assembly. Upon relaxation of the external force, the springs urge the members 13 and 14 apart, and the buckle is returned to the retracted position as shown in FIG. 1.

Figure 12:
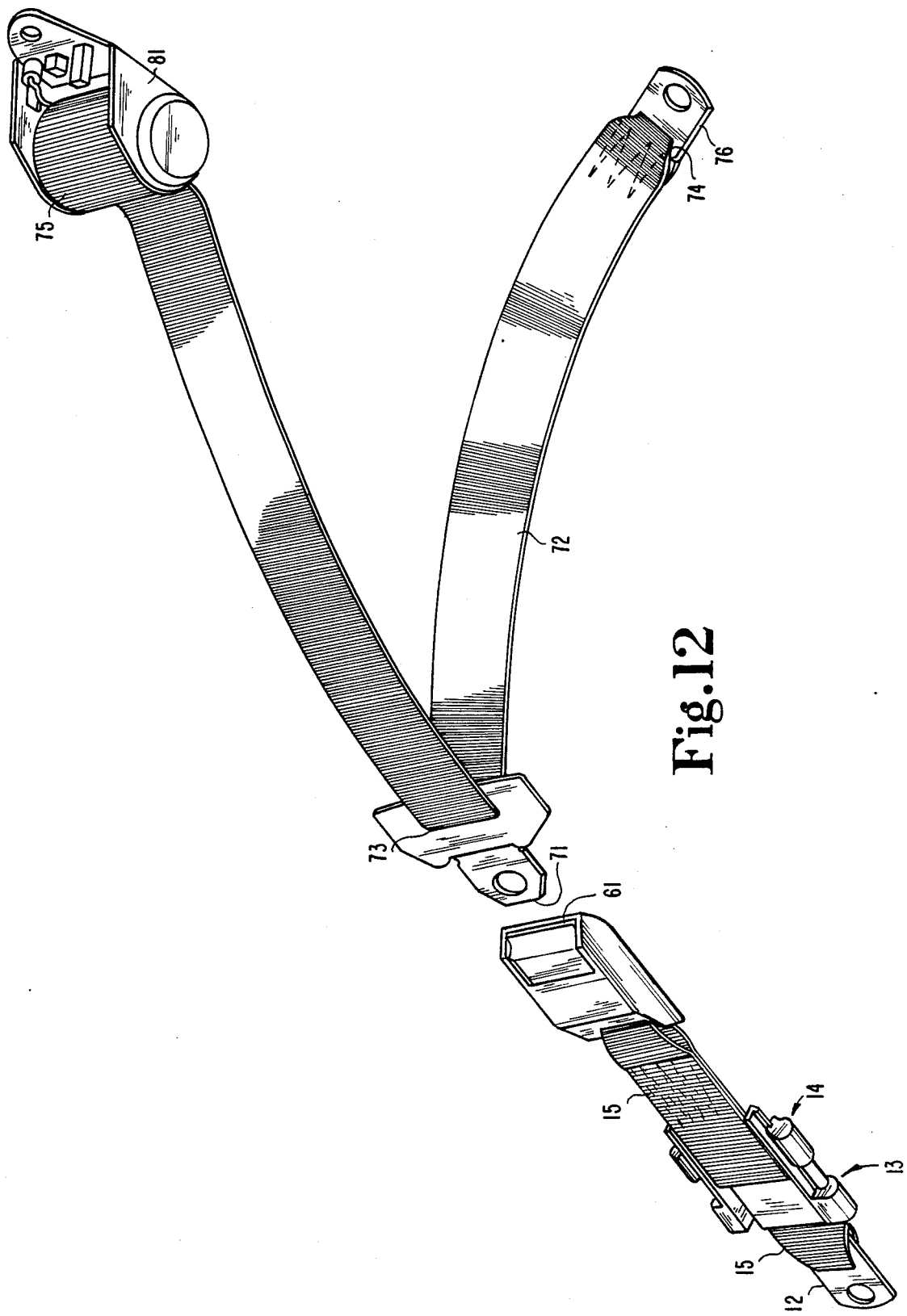
FIG. 12 is a perspective view of a first alternate embodiment of a seat belt system with shoulder strap showing the members of the system, including the retractor assembly, the tongue and joining member, and the buckle assembly of FIG. 1 with cover fully removed to reveal the connecting members. The buckle is shown in the extended position relative the connecting members.

FIG. 12 represents a first alternate embodiment of a seat belt system construced according to the present invention. The buckle assembly comprising connecting members 13 and 14, flexible webbing 15 and bracket 12, is arranged so that the mouth of the buckle 61 is in a position to receive the leading edge of the tongue 71. The tongue 71 is preferably attached to flexible webbing 72 by means of an aperture 73 through which the flexible webbing 72 freely passes. One end 74 of the webbing 72 is attached to a mounting bracket 76. A second end 75 of the webbing 72 is attached to a retraction assembly 81. The tongue 71 engages into the mouth of the buckle 61 to join the various pieces into an integrated complete system, thereby providing a means to restrain a user in a particular position in a seat.

Figure 13:
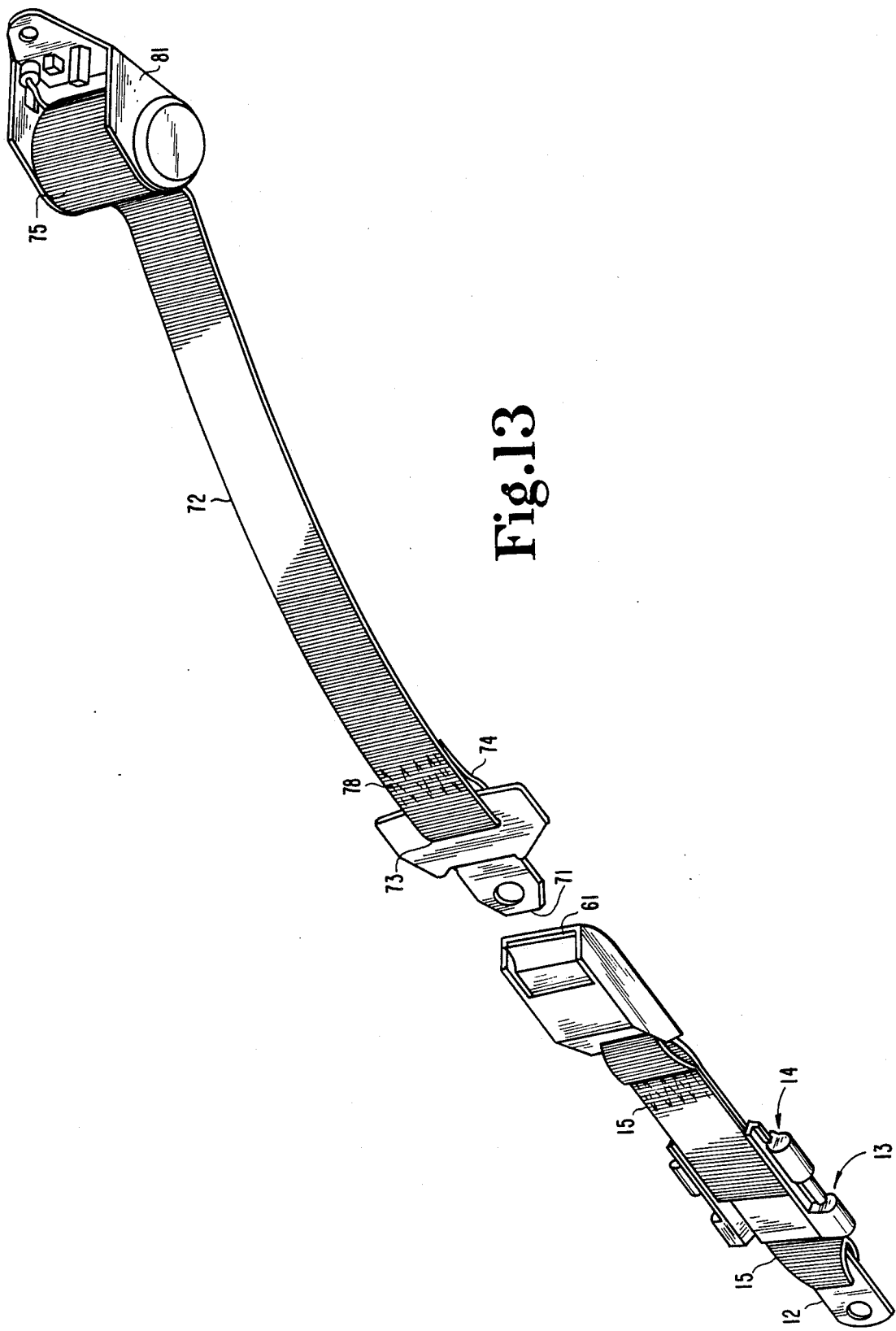
FIG. 13 is a perspective view of the preferred embodiment of the seat belt system showing the members of the system, including the retractor assembly, the tongue and joining member, and the buckle assembly with cover fully removed. The buckle is shown in the extended position relative the connecting members.

FIG. 13 shows the preferred embodiment of the present invention wherein the seat belt system is a lap belt system. In this case, the flexible webbing 72 loops back through the aperture 73. The end 74 of the flexible webbing furthest from the retractor 81 is then held in place with stitching 78. Again, the tongue 71 is positioned to engage into the mouth of the buckle 61 to join the various pieces into an integrated complete system useful to restrain the user within a seat.

In the embodiment of the seat belt system shown in FIGS. 12 and 13 incorporating a tongue assembly with joining members, a buckle assembly including connecting members and mounting bracket, a retractor assembly 81 like that disclosed in U.S. Pat. No. 3,603,525 may be used. A buckle 61 like that disclosed in U.S. Pat. No. 4,404,715 may be used as part of the buckle assembly. U.S. Pat. Nos. 3,603,525 and 4,404,715 are hereby incorporated by reference. The buckle assembly additionally includes connecting members 14 and 15 movable relative to each other and constructed as previously disclosed herein.

The operation of assembly 10 in combination with an automatic locking retractor system is as follows. When the lap belt arrangement is engaged with the buckle 11, the belt will retract to rest against the user. In this condition, the retractor will not pay out any belting, and the user is restrained in position against the seat. If the seat moves downwardly, as may occur when traveling over a rough surface, then the retractor will sense the presence of slack in the belt, and it will collect additional length of belt. In the absence of the present invention, the user would be restricted by this action, and would be held more firmly than desired in the seat, or the seat may in fact be held down in a constrained position. Further downward movement of the seat would result in additional cinching down of the user and seat. However, the present invention avoids this occurrence.

When the seat moves downward, the additional length of belt is retracted by the automatic locking retractor. However, when the seat moves back up to its original position, the assembly 10 allows the buckle to move outwardly, paying out a portion of the belting 15. The force of the seat moving upward, as caused perhaps by the spring support for the seat, applies an external force causing the members 13 and 14 to move relative one another, moving the buckle to the extended position of FIG. 1. The seat is thus positioned in the starting position with the lap belt held against the user and tensioned by the springs 19 and 20 urging the members together and the belting 15 back to the relatively retracted position.

When the seat and user again move downward, such as in reaction to a rough ride, the assembly 10, rather than the automatic locking retractor, collects the slack belt. To assure this, the retracting force applied by the springs 19 and 20 is predetermined to exceed that of the automatic locking retractor. Thus, the slackened belt is preferentially collected by the assembly. Then when the seat and user again move upwardly to the original position, the assembly pays out belt 15 to accommodate such movement. The assembly 10 thereby avoids the cinching down of the lap belt against the user and seat.

Various means may be provided for permitting the buckle 11 to move between the extended and retracted positions. In the embodiment shown in FIG. 1, the movement means comprises the sliding members 13 and 14 in cooperation with springs 19 and 20 and belt 15. As shown particularly in FIG. 2, the belt 15 includes portions wrapped over surfaces of the members 13 and 14. Specifically, belt 15 includes a first portion 54 attached with buckle 11 and extending over the outer surface of center portion 32 of connecting member 14. A second belt portion 55 extends between the inner surfaces of center portions 32 and 41 of members 14 and 13, respectively. Finally, a third portion 56 extends adjacent the outer surface of center portion 41 and connects with bracket 12. By this arrangement, pulling force applied outwardly on buckle 11 through belt 15 will move the sliding members 13 and 14 away from each other, against the force of springs 19 and 20. Relaxation of the external force will permit the springs 19 and 20 to move the members back to the original position of FIG. 1.

The present invention incorporates a means of overcoming the cinching problem commonly present in seat belt systems having an automatic locking retractor. The described buckle assembly provides a compact, durable design which parallels the belt system and does not impair its operation. The protective cover and design features such as use of compression springs assures a high fatigue life.

Figure 14:
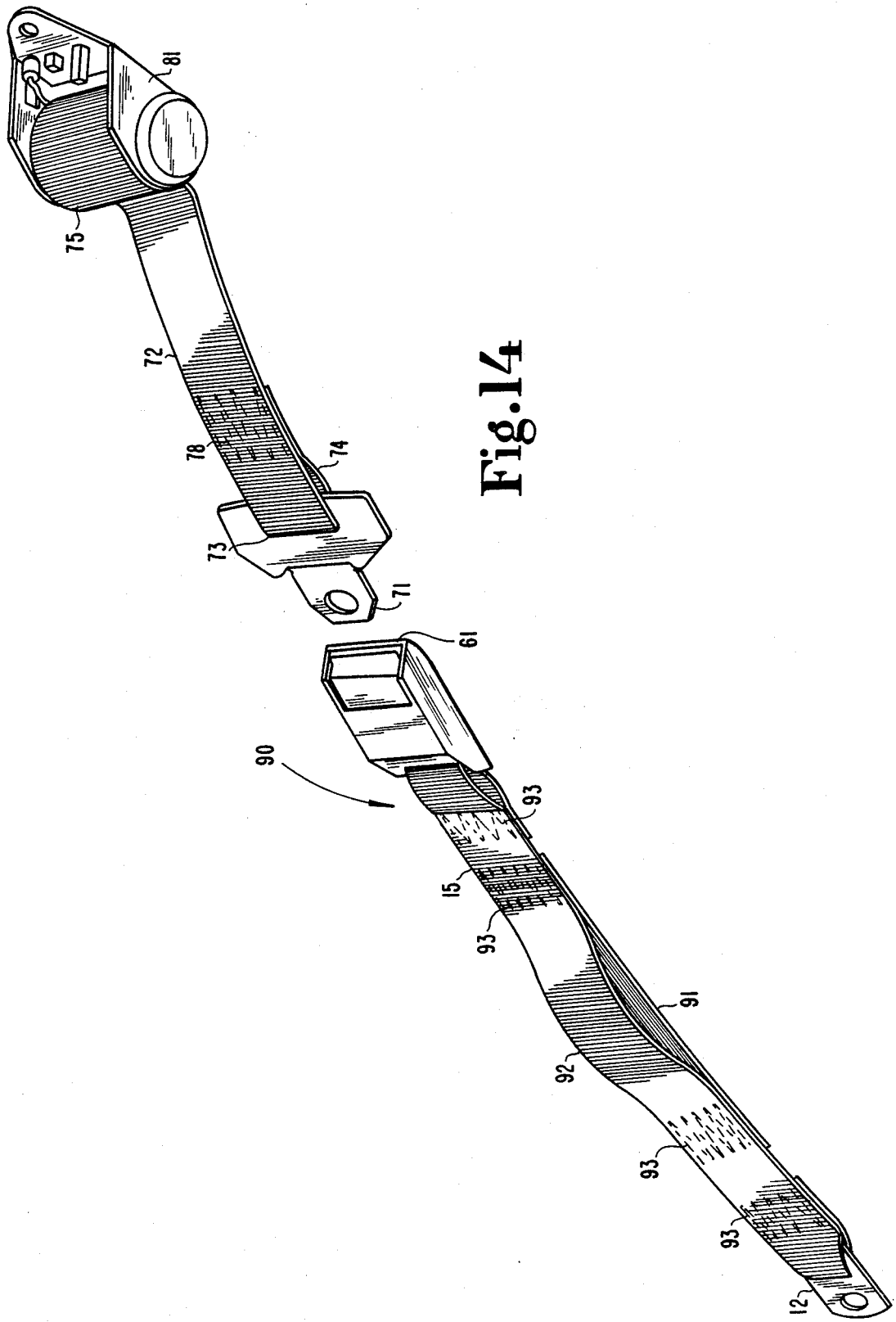
FIG. 14 is a perspective view of a second alternate embodiment of the seat belt system with the belt sleeve fully removed.
Figure 15:
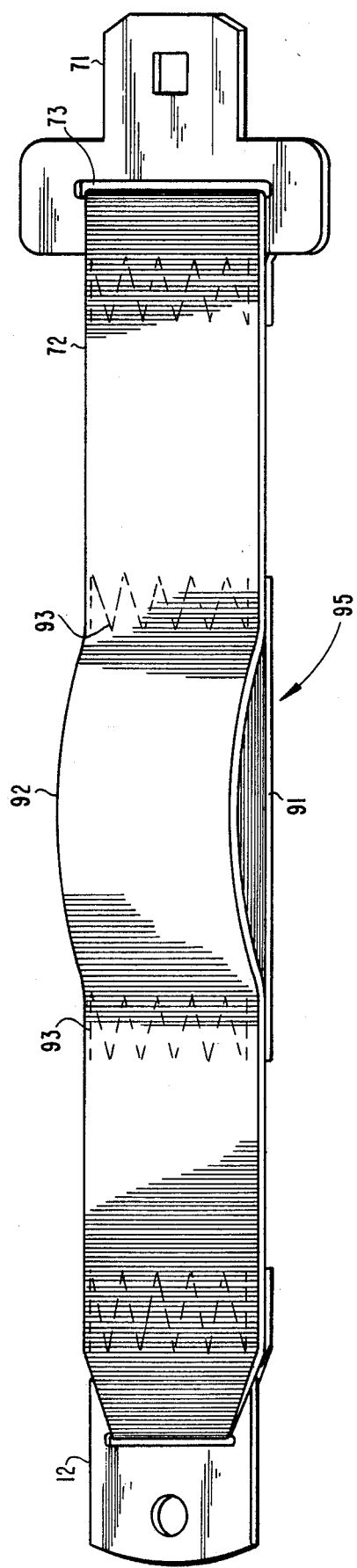
FIG. 15 is a perspective view of the left portions of the embodiment of FIG. 14 with a tongue attached in lieu of a buckle.
Figure 16:
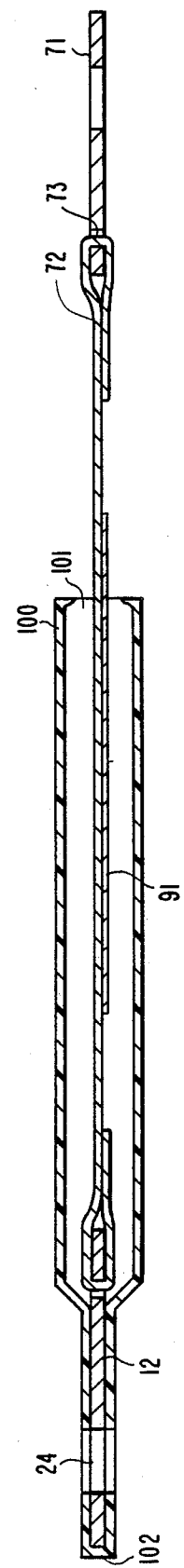
FIG. 16 is a side, cross-sectional view of the assembly of FIG. 15, shown in the extended position and with a sleeve.

Turning now to FIGS. 14 through 16, there is shown a seat belt buckle assembly 90 and a seat belt tongue assembly 95, according to a second alternate embodiment of the present invention. In FIG. 14 an elastic member 91 is sewn to the webbing 15 to create an arch 92 in the flexible webbing 15 when the elastic member 91 is in the normally relaxed position. The elastic member 91 is shown stitched to the flexible webbing 15 in two locations at 93. When an external force is applied to pull the buckle 61 outwardly of the bracket 12, the elastic member 91 stretches. Stretching of the elastic member 91 causes the loop 92 to flatten until it becomes parallel to the elastic member 91 in the most extended position. This movement provides give to the buckle assembly 90 shown in FIG. 14 so that the buckle 61 extends relative to the bracket 12. The seat belt assembly shown is of the lap belt style wherein the flexible webbing 72 attached to the retractor 81 is looped through the aperture 73 and tongue 71, turns back on itself and is stitched at 78 so that it remains in place. A flexible sleeve 100 such as that shown in cross-section in FIG. 16 may be used in the assembly. Further, the second alternate embodiment may be used on a tongue assembly 95 as shown in FIG. 15 in addition to use on a buckle assembly 90 as shown in FIG. 14.

FIG. 15 demonstrates the second alternate embodiment of the present invention in the relaxed position and used with a tongue assembly 95. Flexible webbing 72 is attached to a bracket 12 at one end and through an aperture 73 and a tongue 71, looped back upon itself and stitched. The elastic member 91 is sewn at 93 to the flexible webbing 72, creating the loop 92. Again, when an external force is applied, such as that supplied by upward movement of a car seat, the elastic member 91 stretches in response, allowing the tongue 71 to extend relative the bracket 12 until the flexible webbing 72 at loop 92 becomes parallel to the elastic member 91. At this point the elastic member 91 cannot stretch further because the flexible webbing 72 does not have longitudinal give. When the external force subsides the elastic member returns to its relaxed state and the loop 92 is recreated.

FIG. 16 demonstrates the embodiment of FIG. 15 in cross-section and with the elastic member 91 in the extended position. The elastic member 91 and substantial portions of the webbing 72 are contained within a sleeve 100. Sleeve 100 has a closed end 102 attached to bracket 12. The sleeve 100 has at the other end an opening 101 through which the tongue 71 and webbing 72 are extendable. A blow molded compact boot arrangement is preferably used as the sleeve 100.

The embodiment of the present invention shown in FIGS. 14, 15, and 16 operates in much the same way as the embodiment shown in FIGS. 1 through 13. When the seat moves downward, the additional length of belt is retracted by the automatic locking retractor 81. However, when the seat moves back up to its original position, the assembly 90 or the assembly 95 allows the buckle or tongue to move outwardly paying out a portion of the belting. The force of the seat moving upward, as caused perhaps by the spring support for the seat, applies an external force causing the elastic member 91 to stretch, moving the tongue 71 of FIG. 15 or the buckle 61 of FIG. 14 to the extended position of FIG. 16. The seat is thus positioned in the starting position with the lap belt held against the user and tensioned by the elastic force of the elastic member 91. The elastic member 91 must have a relaxing force which is predetermined to exceed the force supplied by the automatic locking retractor. Thus, the slack in belt is preferentially collected by the elastic member 91. For this purpose, elastic webbing such as that supplied by United Elastic Corporation Stock No. M4-0793E-1 one-half inch is suitable. The assembly 90 or the assembly 95 thereby avoids the cinching down of the lap belt against the user and seat.

Figure 17:
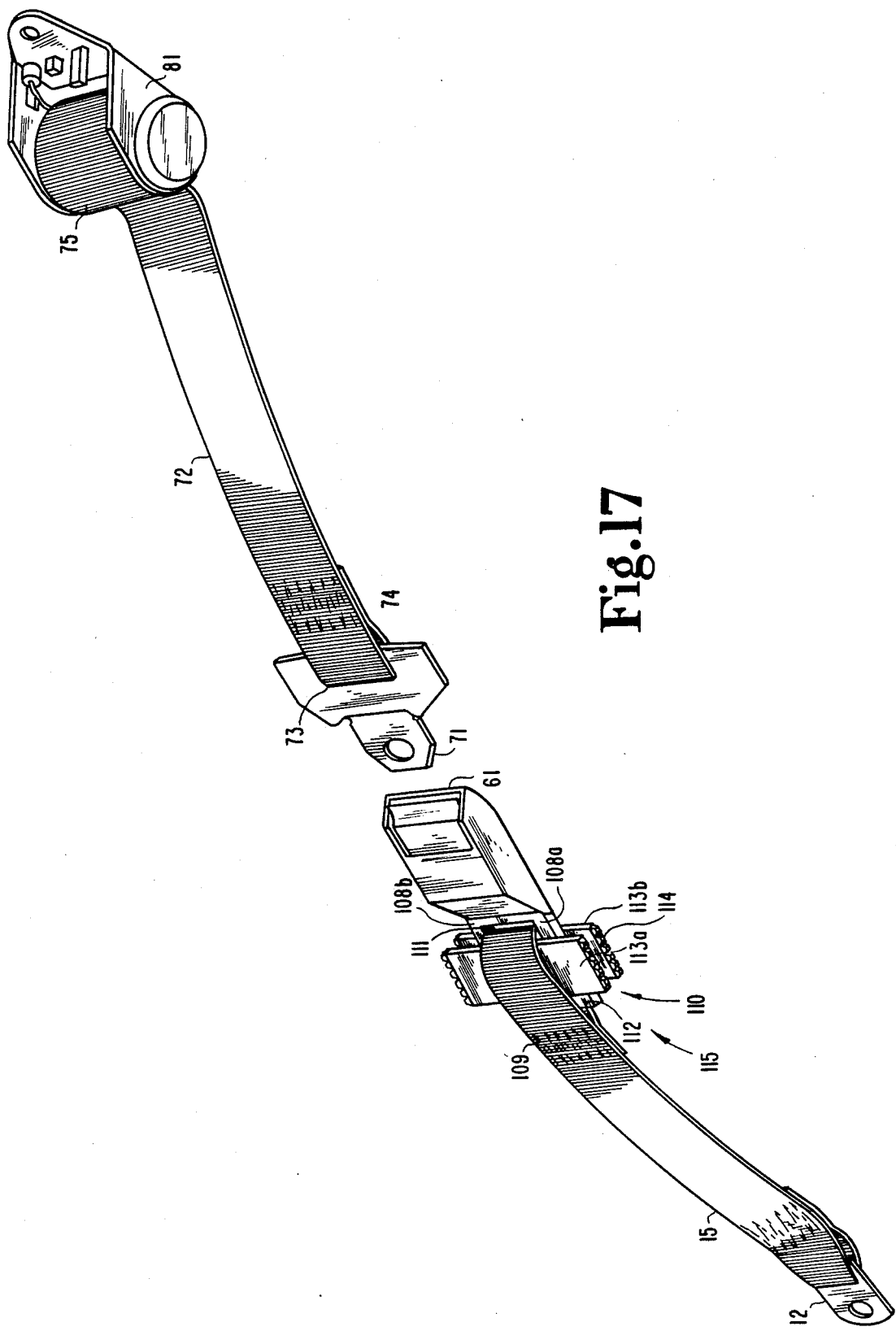
FIG. 17 is a perspective view of a seat belt system showing a third embodiment of the present invention and including optional gripper ends.

FIGS. 17 through 22 show yet another embodiment of the present invention. Specifically, in FIG. 17 there is shown a seat belt system wherein the buckle assembly 115 is made according to a third embodiment of the present invention. The seat belt system includes a buckle 61, a bracket 12, a tongue 71 and retractor 81 and at least two pieces of flexible webbing 72 and 15. The embodiment of FIG. 17 shows a U-shaped latch 110 with optional wing-like side handles 113a and 113b and gripper ends 114. The U-shaped latch 110 fits between the flexible webbing 15 and a crossbar 112 attached by the bars 108a and 108b to the buckle creating the aperture 111 through which the webbing 15 passes. Rearward of the buckle 61 continue two parallel bars 108a and 108b. These two parallel bars 108a and 108b terminate in the crossbar 112, thus creating the aperture 111. The webbing 15 passes over both the bar 112 and the U-shaped latch 110, through the aperture 111 of the buckle and loops back under and is stitched at 109. The U-shaped latch 110 is movable relative the buckle 61 so that the buckle may extend relative the bracket 12 when a predetermined external force is applied. The U-shaped latch 110 is preferably made of a nonmetallic material.

Turning to FIG. 18, the third embodiment of the present invention is shown as part of a tongue assembly 120 including flexible webbing 72, a mounting bracket 12 including a mounting hole 24 for securing the bracket to the vehicle. Belt 15 extends over meember 112, through aperture 122 and beneath member 112 with the belt end stitched at location 109 to the belt main body. Tongue 71 includes two rearwardly extending bars 120a and 120b terminating at crossbar 121 to form an aperture 122. Crossbar 121 is identical to crossbar 112. As in FIG. 17 the U-shaped member 110 (shown with the optional side handles 113 and grippers 114) fits into the aperture 122, embracing the bar 121 of the tongue 71 which is closest to the bracket 12. The U-shaped member 110 is movable relative the tongue 71 and in response to a predetermined external force the U-shaped member 110 allows the tongue 71 to extend relative the bracket 12. U-shaped latch 110 has a means to exert a force to return the tongue 71 to its relatively retracted position with respect to the bracket 12.

FIG. 19 shows the U-shaped member 110 without the optional side handles 113 and removed from the seat belt assembly. The view shown may be regarded as the top or the bottom of the U-shaped member 110. At locations 116a and 116b are shown two surface prominences which may be formed by pressing or stamping the nonmetallic material of the U-shaped member 110. These prominences 116a and 116b allow for insertion of springs having a diameter greater than the height of the U-shaped member 110. A side groove 117 of the U-shaped member 110 allows the rearwardly extending bars 108a and 108b of the buckle 61 or the bars 120a and 120b of the tongue 71 to be received into such groove 117 so that it cannot cock sideways or become oblique relative the axis of the buckle 61 or tongue 71 assembly. An approximately identical groove 117b is located on the opposite side of the U-shaped member 110. Slot 118 receives crossbar 121 of a tongue 71 or crossbar 112 of a buckle 61. The depth of slot 118 is less than or equal to forty percent of the width of the U-shaped member 110.

FIG. 20 is a side, plan view of the U-shaped member 110 showing the slot 118 for receving crossbar 121 or 112 and the groove 117 for receiving the rearward extending bars 108a and 108b or 120a and 120b.

Figure 21:
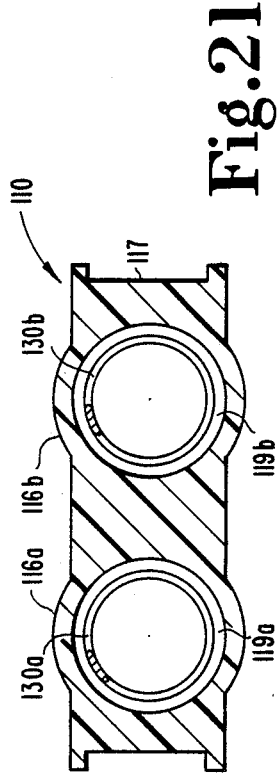
FIG. 21 is a front, cross-sectional view of the bracket of FIG. 19, taken along line 21—21 and looking in the direction of the arrows.

A cross-sectional view along line 21 to 21 of FIG. 19 and looking in the direction of the arrows is shown in FIG. 21. Two blind holes 119a and 119b are shown. These blind holes receive compression springs 130a and 130b (seen in cross-section).

Figure 22:
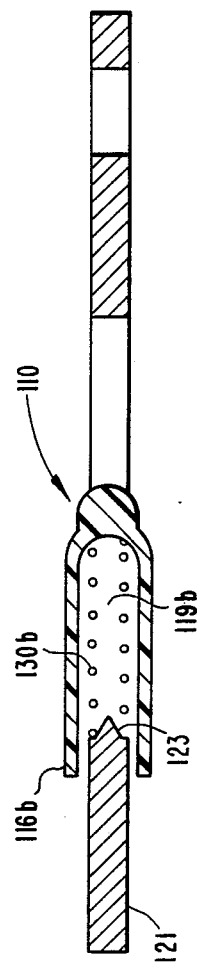
FIG. 22 is a side, cross-sectional view taken along line 22—22 of FIG. 19 and including a cross-section of the tongue showing a spring-holding protrusion. The joining members are not shown.

FIG. 22 shows a side cross-section of U-shaped member 110 through the line 22—22 of FIG. 19. Compression spring 130b is in place within blind hole 119b and extending posteriorly of the blind hole. The bar 121 of a tongue 71 is shown with a projection 123. The outer diameter of the projection 123 is less than the inner diameter of compression spring 130b. Thus, the projection 123 fits within the extending portion of the compression spring 130b to hold the compression spring in place, preventing lateral movement of the compression spring 130b. Another compression spring 130a is identically configured within blind hole 119a in relation to the projection 123. Note that the flexible webbing 72 is not shown in FIG. 22. Additionally, when the U-shaped member 110 is used with a buckle assembly, the same configuration of the bar 112 with projections is useful.

The operation of the U-shaped member 110 when used in a seat belt system is simialr to the operation of the previous embodiments described above. When the seat moves downward, the additional length of belt is retracted by the automatic locking retractor 81. However, when the seat moves back up to its original position, the assembly 115 or the assembly 120 permits the buckle or tongue to move outwardly, paying out a portion of the belting. The force of the seat moving upward, as caused perhaps by the spring support for the seat, applies an external force causing the compression springs 130 to compress and allowing the tongue 71 or the buckle 61 to move to an extended position. The seat is thus positioned in the starting position with the lap belt held against the user and tensioned by the force of the springs 130. The compression springs 130 must have a retracting force greater than the retracting force of the retractor 81 so that when the external force decreases below a predetermined level (below the retracting force of the springs 130) the resultant slack is preferentially collected by the U-shaped member 110 via the compression springs 130.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A seat belt assembly which comprises:
a first belt connector;
a retractor assembly;
linking means between said first belt connector and said retractor assembly;
a mounting bracket;
a second belt connector lockable with said first belt connector to form a tongue-buckle combination;
a first connecting member connectable with said bracket;
first connecting means for connecting said first connecting member with said bracket;
a second connecting member connectable with said second belt connector;
second connecting means for connecting said second connecting member with said second belt connector;
said first connecting member being coupled with said second connecting member and being movable relative said second connecting member between first and second positions, said second belt connector being retracted relative said bracket in the first position, said second belt connector being extended relative said bracket in the second position; and,
maintaining means composed of at least one biasing member and being for normally maintaining said second belt connector and said bracket in the first position and for exerting a predetermined force to retain said first connecting member and said second connecting member in the first position, said maintaining means also being for permitting said second belt connector and said bracket to move under resistance from the first position to the second position in response to an external force exceeding the predetermined force, said maintaining means also being for returning said second belt connector and said bracket from the second position to the first position upon decrease of the external force below the predetermined force.

2. The assembly of claim 1 and further a second mounting bracket attached to said linking means at one end of said linking means, wherein said first belt connector comprises a tongue, said tongue being positioned between said retractor assembly and said second mounting bracket so that said tongue is freely slidable about said linking means between said retractor assembly and said mounting bracket.

3. The assembly of claim 1 wherein said maintaining means is further for permitting repeated movement of said second belt connector relative said bracket from the first position to the second position in response only to the application of external force.

4. A seat belt assembly which comprises:
a first belt connector;
a retractor assembly;
linking means between said first belt connector and said retractor assembly;
a mounting bracket;
a second belt connector lockable with said first belt connector to form a tongue-buckle combination;
a first connecting member connectable with said bracket;
first connecting means for connecting said first connecting member with said bracket;
a second connecting member connectable with said second belt connector;
second connecting means for connecting said second connecting member with said second belt connector;
said first connecting member being coupled with said second connecting member and being movable relative said second connecting member between first and second positions, said second belt connector being retracted relative said bracket in the first position, said second belt connector being extended relative said bracket in the second position; and,
maintaining means for normally maintaining said second belt connector and said bracket in the first position and for exerting a predetermined force to retain said first connecting member and said second connecting member in the first position, said maintaining means also being for permitting said second belt connector and said bracket to move under resistance from the first position to the second position in response to an external force exceeding the predetermined force, said maintaining means also being for returning said second belt connector and said bracket from the second position to the first position upon decrease of the external force below the predetermined force, and said maintaining means comprising at least one compression spring connected between said first connecting member and said second connecting member and exerting a predetermined force urging said first connecting member and said second connecting member into the first position.

5. The assembly of claim 4 wherein said linking means, said first connecting means and said second connecting means comprise flexible webbing.

6. A seat belt assembly which comprises:
a first belt connector;
a retractor assembly;
linking means between said first belt connector and said retractor assembly;
a mounting bracket;
a second belt connector lockable with said first belt connector to form a tongue-buckle combination;
a first connecting member connectable with said bracket;
first connecting means for connecting said first connecting member with said bracket;
a second connecting member connectable with said second belt connector;
second connecting means for connecting said second connecting member with said second belt connector;
said first connecting member being coupled with said second connecting member and being movable relative said second connecting member between first and second positions, said second belt connector being retracted relative said bracket in the first position, said second belt connector being extended relative said bracket in the second position, one of said first connecting member and said second connecting member including a center portion and two outer portions, the two outer portions defining a pair of oppositely-facing grooves, the other of said connecting members including a center portion and two outer portions, the outer portions of the said other connecting member defining a pair of oppositely-facing tongues slidably received within respective grooves of said one connecting member; and,
maintaining means for normally maintaining said second belt connector and said bracket in the first position and for exerting a predetermined force to retain said first connecting member and said second connecting member in the first position, said maintaining means also being for permitting said second belt connector and said bracket to move under resistance from the first position to the second position in response to an external force exceeding the predetermined force, said maintaining means also being for returning said second belt connector and said bracket from the second position to the first position upon decrease of the external force below the predetermined force, and said maintaining means comprising a compression spring connected between said first connecting member and said second connecting member and exerting a predetermined force urging said first connecting member and said second connecting member in the first position.

7. The assembly of claim 6 wherein said linking means comprising flexible webbing, and wherein the center portions of said first connecting member and said second connecting member lie one over the other and define inner and outer surfaces, said connecting means comprises flexible webbing having a first end and a second end, said flexible webbing from the first end to the second end extending consecutively adjacent the outer surface of one center portion in a first direction, back in the other direction between the inner surfaces of the two center portion, and back again in the first direction adjacent the outer surface of the other center portion, said first and second connecting means comprising means for connecting one end of said webbing to said bracket and the other end of said webbing to said second belt connector, respectively.

8. A seat belt assembly which comprises:
a tongue;
a belt buckle;
mounting brackets;
linking means for linking said tongue to one mounting bracket and for linking said buckle to another mounting bracket;
linking portions for joining said linking means with said belt buckle and said tongue;
a retractor assembly; and,
collecting means for collecting and paying out predetermined slack in said linking means in lieu of collection of such slack by said retractor assembly.

9. The assembly of claim 8 wherein said collecting means comprises an elastic member, said elastic member having at least two ends and at least two of the ends being attached to said linking means so that said elastic member is approximately aligned with said linking means, said elastic member having a first position in which said elastic member is at rest and a second position in which said elastic member is stretched.

10. The assembly of claim 8 wherein said collecting means comprises:
a substantially U-shaped member coupled with one of said linking portions and being movable relative the one of said linking portions between first and second positions; and,
maintaining means for normally maintaining said U-shaped member in the first position and for exerting a predetermined force to retain said U-shaped member in the first position relative the one of said linking portions, said maintaining means permitting said U-shaped member to move under resistance from the first position to the second position in response to an external force exceeding the predetermined force, said maintaining means also returning said U-shaped member from the second position to the first position upon decrease of the external force below the predetermined force.

11. A seat belt assembly comprising:
a tongue;
a belt buckle;
mounting brackets;
linking means for linking said tongue to one mounting bracket and for linking said buckle to another mounting bracket;
linking portions for joining said linking means with said belt buckle and said tongue;
a retractor assembly; and,
an elastic member movable from a first position to a second position in response to a predetermined external force and said elastic member returning to the first position as the external force diminishes.

12. The assembly of claim 11 wherein said linking means is flexible webbing and said elastic member has at least two ends and at least two of the ends are attached to said flexible webbing.

13. The assembly of claim 12 wherein said flexible webbing forms an approximate arch between the two attached ends of said elastic member when said elastic member is in the first position, and said flexible webbing being longitudinally approximately parallel said elastic member throughout the length of said elastic member in the second position.

14. The assembly of claim 13 and further including a cover enclosing said elastic member and said flexible webbing.

15. A seat belt assembly comprising:
   a tongue;
   a belt buckle;
   mounting brackets;
   linking means for linking said tongue to one mounting bracket and for linking said buckle to another mounting bracket;
   linking portions for joining said linking means with said belt buckle and said tongue;
   a retractor assembly;
   a U-shaped member being coupled with one of said linking portions and being movalbe relative said one of said linking portions between first and second positions; and,
   maintaining means for normally maintaining said U-shaped member in the first position and for exerting a predetermined force to retain said U-shaped member in the first position relative said one of said linking portions, said maintaining means permitting said U-shaped member to move under resistance from the first position to the second position in response to an external force exceeding the predetermined force, said maintaining means also returning said U-shaped member from the second position to the first position upon decrease of the external force below the predetermined force.

16. The assembly of claim 15 wherein said U-shaped member is provided with at least one bore.

17. The assembly of claim 16 wherein said maintaining means comprises:
   at least one compression spring, said compression spring fitting axially within said bore and said compression spring having a one end extending rearwardly external of said bore; and,
   at least one projection on said one of said linking portions, said projection arranged to be in registry with the axis of said compression spring and said projection projecting inside one end of said compression spring.

18. The assembly of claim 15 wherein said U-shaped member has at least one lateral groove positioned to receive a part of said one of said linking portions in such a way as to limit said U-shaped member from rotating relative said one of said linking portions.

* * * * *

REEXAMINATION CERTIFICATE (3486th)
United States Patent [19]
Bougher et al.

[11] B1 4,919,484
[45] Certificate Issued  *Apr. 14, 1998

[54] ANTI-CINCH SEAT BELT SYSTEM

[75] Inventors: Jerry D. Bougher, Lebanon; James R. Anthony, Carmel; Jeffrey L. Williams, Zionsville; Ronald F. Homeier, Plainfield; Allan R. Lortz, Carmel, all of Ind.

[73] Assignee: Indiana Mills & Manufacturing, Inc., Westfield, Ind.

Reexamination Request:
No. 90/004,259, May 31, 1996

Reexamination Certificate for:
Patent No.: 4,919,484
Issued: Apr. 24, 1990
Appl. No.: 302,788
Filed: Jan. 26, 1989

[*] Notice: The portion of the term of this patent subsequent to May 23, 2006, has been disclaimed.

Related U.S. Application Data

[63] Continuation-in-part of Ser. No. 111,182, Oct. 22, 1987.

[51] Int. Cl.$^6$ .................................................. B60R 22/00
[52] U.S. Cl. ......................................... 297/474; 280/801
[58] Field of Search ............................. 297/468, 470, 297/471, 474, 480; 280/801

[56] References Cited

U.S. PATENT DOCUMENTS

| | | | |
|---|---|---|---|
| 2,823,046 | 2/1958 | Banta | 297/471 |
| 3,074,760 | 1/1963 | Hodgekin | 297/471 |
| 3,107,121 | 10/1963 | Mougey | 297/474 |
| 3,243,232 | 3/1966 | Blaszkowski | 297/474 |
| 3,300,248 | 1/1967 | Nakolan | 297/474 |
| 3,318,634 | 5/1967 | Nicholas | 297/474 |
| 3,429,614 | 2/1969 | Huggins | 297/474 |
| 3,551,002 | 12/1970 | Dozois | 297/474 |
| 3,583,763 | 6/1971 | Settimi | 297/474 |
| 3,584,896 | 6/1971 | Jantzen | 297/474 |
| 3,606,456 | 9/1971 | Cazabon | 297/474 |
| 3,807,798 | 4/1974 | Mattson | 297/471 |
| 4,138,157 | 2/1979 | Pickett | 297/472 |
| 4,201,418 | 5/1980 | Reidelbach | 297/474 |
| 4,506,912 | 3/1985 | Ahad | 297/474 X |
| 4,611,854 | 9/1986 | Pfeiffer | 280/801 X |

FOREIGN PATENT DOCUMENTS

26 26 159  12/1977  Germany .................. 297/471

*Primary Examiner*—Peter R. Brown

[57] ABSTRACT

A seat belt system which incorporates a seat belt assembly including a buckle and mounting brackets, a tongue, a retractor, and webbed belting is disclosed in combination with a member for collecting a predetermined amount of slack in the system in lieu of its collection by the retractor. The member for collecting slack having a relatively retracted first position and a relatively extended second position and including a feature to urge the member to the first position. The application of an external force of sufficient magnitude causes the member to move to the second position, but when the force is withdrawn, the member returns to the first position. When used in a system which also incorporates a retractor assembly, the seat buckle assembly overcomes the tendency of the system to cinch down on the user.

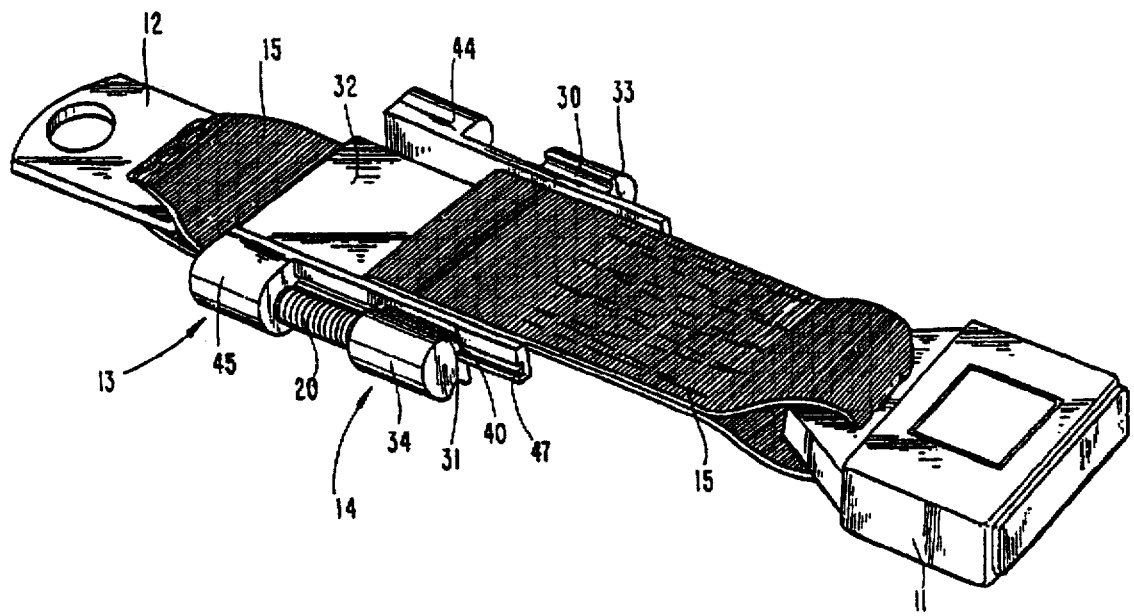

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–10, 15–18 is confirmed.

Claim 11 is determined to be patentable as amended.

Claims 12–14 dependent on an amended claim, are determined to be patentable.

11. A seat belt assembly comprising:

a tongue;

a belt buckle;

linking means for linking said tongue to one mounting bracket and for linking said buckle to another mounting bracket;

linking portions for joining said linking means with said belt buckle and said tongue;

a retractor assembly; and, an elastic member movable from a first position to a second position in response to a predetermined external force and said elastic member returning to the first position as the external force diminishes;

*said elastic member collects and pays out predetermined slack in said linking means in lieu of collection of such slack by said retractor assembly.*

* * * * *